US007094154B2

(12) United States Patent
Kellerman et al.

(10) Patent No.: US 7,094,154 B2
(45) Date of Patent: Aug. 22, 2006

(54) COMPUTER NETWORKED GAME SYSTEM UTILIZING SUBSCRIPTION BASED MEMBERSHIP AND ALTERNATIVE METHODS OF ENTRY

(75) Inventors: Jason B. Kellerman, San Francisco, CA (US); Marc E. Marin, Littleton, CO (US)

(73) Assignee: MMJK LLC, Littleton, CO (US)

( * ) Notice: Subject to any disclaimer, the term of this patent is extended or adjusted under 35 U.S.C. 154(b) by 104 days.

(21) Appl. No.: 11/026,783

(22) Filed: Dec. 30, 2004

(65) Prior Publication Data

US 2006/0148567 A1 Jul. 6, 2006

(51) Int. Cl.
*A63F 9/24* (2006.01)
*G06F 17/00* (2006.01)

(52) U.S. Cl. ........................... 463/42; 463/25; 700/92; 700/93; 340/323 R

(58) Field of Classification Search ..................... None
See application file for complete search history.

(56) References Cited

U.S. PATENT DOCUMENTS 5,768,382 A * 6/1998 Schneier et al. ............ 380/251
5,779,549 A * 7/1998 Walker et al. ................ 463/42
6,224,486 B1 5/2001 Walker et al. ................ 463/42
6,425,828 B1 7/2002 Walker et al. ................ 463/42
6,450,885 B1 9/2002 Schneier et al. .............. 463/29
6,699,125 B1 3/2004 Kirmse et al. ................ 463/42
6,749,510 B1 6/2004 Giobbi et al. ................. 463/42
2002/0002076 A1 1/2002 Scheier et al. ................ 463/29
2002/0123377 A1 9/2002 Shulman ........................ 463/13
2002/0128057 A1 9/2002 Walker et al. ................ 463/20
2002/0147043 A1 10/2002 Shulman et al. .............. 463/42
2002/0193162 A1 12/2002 Walker et al. ................ 463/42
2003/0070178 A1 4/2003 Boyd et al. ................. 725/110
2003/0073499 A1 4/2003 Reece .......................... 463/42
2003/0190960 A1 10/2003 Jokipii et al. ................. 463/42

* cited by examiner

*Primary Examiner*—Mark Sager
(74) *Attorney, Agent, or Firm*—Dergosits & Noah LLP

(57) ABSTRACT

A computer networked, multi-user game system utilizing subscription based membership and alternative methods of entry, as well as the award of prizes of immediate value to the winner is described. A game tournament is hosted by a game server computer coupled to client computers operated by participating players. The games offered are games that involve elements of both skill and chance and require active player participation and decision making. A subscription-based membership is established for each player by charging a fee for a pre-determined membership time period. An alternative method of entry is provided to allow non-subscription players to participate in the tournament without payment of the fee. The non-subscribing players receive equal access to the games and at least the same chance of winning as the subscribing players, but are limited to a single entry per game or tournament. The game server hosts at least one game or tournament within the period, and players are potentially eliminated until a winning player and any runner-up players are determined. A prize pool is disbursed to the winning players in the form of cash, cash-equivalent notes, or prizes that have inherent and immediate value.

9 Claims, 8 Drawing Sheets

300

| | # OF WINNERS | PRIZES | COST |
|---|---|---|---|
| OVERALL WINNER | 1 | $10,000 | $10,000 |
| PLACES 2-4 | 3 | 1000 | 3,000 |
| PLACES 5-13 | 9 | 500 | 4,500 |
| TOP 10 GOLD PLAYERS | 10 | 100 | 1,000 |
| TOP 10 SILVER PLAYERS | 10 | 100 | 1,000 |
| TOP 10 BRONZE PLAYERS | 10 | 100 | 1,000 |
| GOLD 11-40 | 30 | 50 | 1,500 |
| SILVER 11-40 | 30 | 50 | 1,500 |
| BRONZE 11-40 | 30 | 50 | 1,500 |
| | 133 | | $25,000 |

FIG.3

COMPUTER NETWORKED GAME SYSTEM UTILIZING SUBSCRIPTION BASED MEMBERSHIP AND ALTERNATIVE METHODS OF ENTRY

FIELD OF THE INVENTION

The present invention relates generally to computerized game systems, and more specifically, to a networked system that supports multi-user game play on a game server computer from a plurality of client computers.

BACKGROUND OF THE INVENTION

The popularity of casino games, and particularly poker, has increased dramatically in the United States within the past several years. The proliferation of casinos and the increased exposure of television programs featuring poker and similar card games has given rise to a significant gaming industry. In the U.S. alone, it is estimated that 50–80 million people play poker regularly. The advent of secure network communications and efficient client/server computer applications has led to the viability of on-line platforms for hosting poker tournaments and similar games. Indeed, some estimates place the online poker market alone to consist of 20–40 million regular players. Significantly, this market is growing rapidly, having approximately tripled in the last year alone to $1.2 to $1.5 billion in annual revenue.

Despite the growing industry potential for online game sites, U.S. gaming laws generally prohibit the operation of gaming sites that provide a platform for gambling, as defined by the elements of consideration, chance, and prize awards. Due to these restrictive gaming laws, many online game and casino web sites are operated overseas. Although many online computer sites presently exist that allow players to participate in various types of games, these sites typically feature disadvantages that present potential legal issues or undue risk to participating players, or do not offer the possibility of a significant prize winning potential.

Online poker sites that allow players to wager their own money mimic actual casino card rooms. However, such sites must operate overseas to skirt U.S. laws, and thus present a high risk to U.S. players. Legal game sites include sites that allow players to compete in skill based games. These types of games, however, typically appeal to only a narrow group of players and not casual players seeking to win money or prizes through simple games involving both skill and chance. Play for fun sites are generally legal sites that focus on casino players who want to play without risking any money. Since no prize money is awarded to winners, such sites are not considered gambling sites. However, their appeal is limited since players are only allowed to play for fin without the chance of winning a prize.

The online poker, or similar game, industry is thus suffering from a lack of sites that provide players with a legal forum for participating in online game tournaments with no financial risk and no legal risk, while providing true competition and the opportunity to win meaningful prizes.

It is thus desirable to provide a legal, subscription-based online game system located in the United States that offers the possibility for players to win significant cash or cash equivalent prizes with no risk.

SUMMARY OF THE INVENTION

A computer networked, multi-user game system utilizing subscription based membership and alternative methods of entry, as well as the award of prizes of immediate value to the winner is described. A game tournament is hosted by a game server computer coupled to one or more client computers operated by participating players. The game hosted by the game server is typically a game that has elements of both skill and chance, and requires active player participation and decision making. A subscription-based membership is established for each player by charging each player a fee for a pre-determined membership time period. Each player selects a game or tournament to be played against other players over the computer network and registers to play that game or tournament. A number of tokens are distributed to each member player participating in the online game or tournament for betting in the game or tournament. For games that do not require token or chip based betting, registration allows entry to the game. An alternative method of entry is provided to allow non-subscription players to participate in the online game or tournament without payment of the subscription fee. Non-subscribing players are only allowed a single entry per game or tournament. For token-based games, non-subscribing players receive at least as many starting tokens as the subscribing players for betting in the game or tournament. The game server hosts at least one game or tournament during the membership time period, the online game or tournament consisting of at least one game round, with each game round potentially eliminating one or more participant players until a winning player and one or more runner-up players are determined. After completion of the game or tournament, the prize pool is disbursed to the winning player and any eligible runner-up players in the form of cash, cash-equivalent notes, or prizes that have inherent and immediate value.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 3 is a table that lists an illustrative prize pool for a hypothetical monthly tournament;

DETAILED DESCRIPTION OF THE PREFERRED EMBODIMENT

Figure 1:
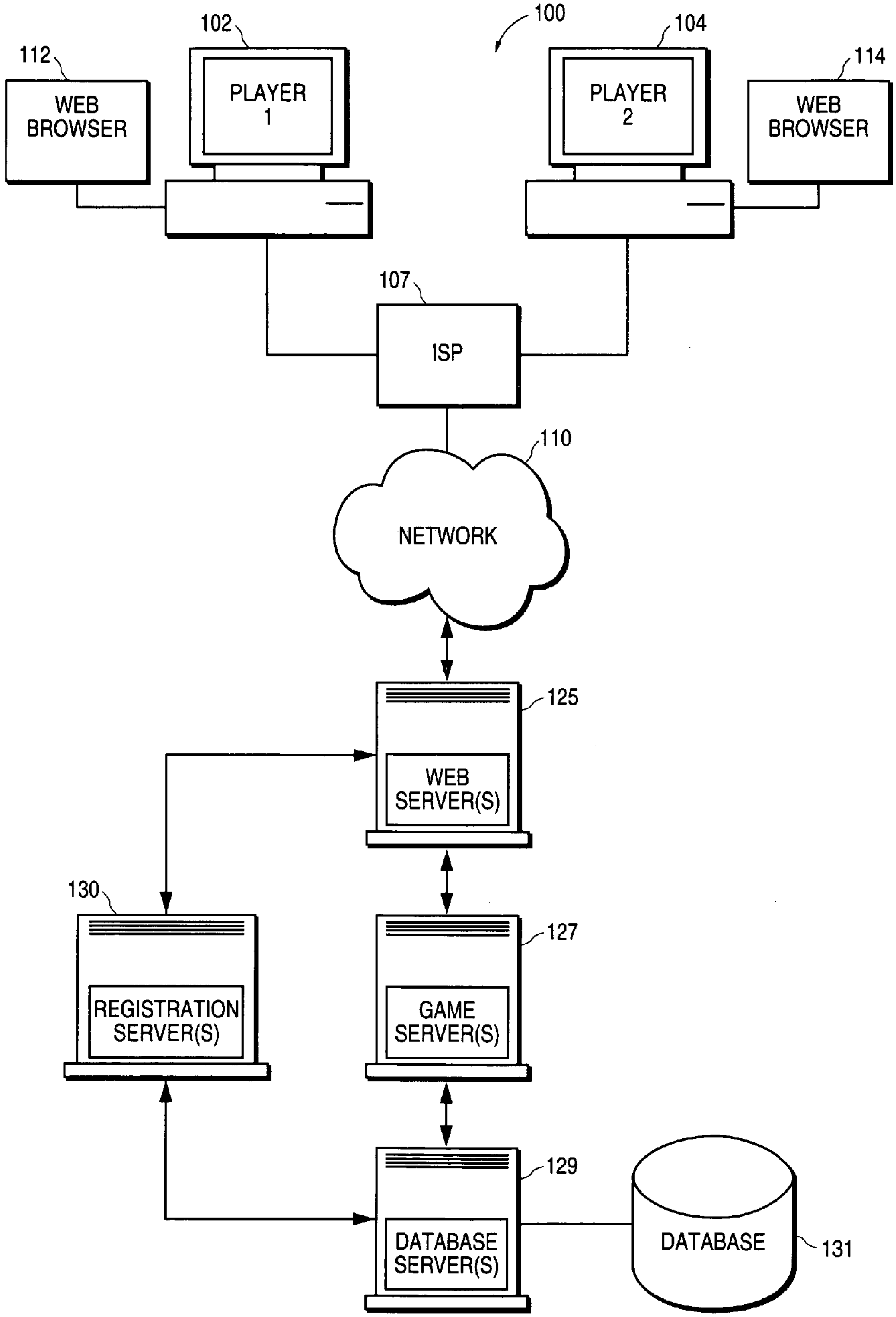
FIG. 1 illustrates a network for implementing an online game accessible to a number of client/server coupled users, according to one embodiment of the present invention.

A computer networked, subscription-based multi-player game system for games involving elements of both skill and chance is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or a fiber or copper-based telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, cellular telephones, game playing devices, digital audio or video playback devices, or any other similar type of computing device. For purposes of the following description, the terms "computer network" and "online" may be used interchangeably and do not imply a particular network embodiment or topography. In general, any type of network (e.g., LAN, WAN, or Internet) may be used to implement the online or computer networked implementation of the game software.

FIG. 1 illustrates an exemplary network system that includes distributed client/server computers for the administration and execution platform of an on-line, multi-player poker game, or similar game involving elements of both skill and chance. In system 100 one or more client computer users 102 and 104 access a game server computer 127 over a network 110 through a web server 125. Each client computer is typically operated by a single player, thus, as shown in FIG. 1, client computer 102 is operated by "player 1" and client computer 104 is operated by "player 2". The game server 127 serves as the game platform by maintaining all game play for all tournaments and daily games that are accessed and played on the game server. The game software can include one or more client modules that are executed on each of the client computers, as well as server modules that are executed on the game server computer. Alternatively, all necessary game program modules may be executed on the game server computer 127 with minimal processing executed on the client computers 102 and 104.

In one embodiment of the present invention, all players must be registered (subscribed) with the game server in order to participate in games hosted by the game server 127. A registration server 130 manages the tasks related to registering users and maintaining user accounts and registrations. If players maintain personalized home pages, the registration server manages the information relating to the individual players. The player profiles, registration information, and all data relating to the games and tournaments is stored in a database 131 maintained by a database server 129. The database 131 may be stored in a separate memory device coupled to database server 129, as shown, or it may be stored in memory resident within server 129 or any other server.

The various server computers 125, 127, 129, and 130 that comprise the game platform are functionally interfaced to one another over bi-directional links, as shown in FIG. 1. Each server computer can be a separate networked computer, as shown. Alternatively, one or more of the server functions performed by servers 125, 127, 129, and 130 can be embodied within a single server computer. Thus, the web server, registration, and database management functions can be integrated within the same server computer that executes the game server program modules, or they can be provided by one or more separate server computers coupled to the game server computer.

For a network embodiment in which the client and server computers communicate over the World Wide Web portion of the Internet, each client computer 102 and 104 typically accesses the network through one or more Internet Service Providers (ISP) 107 and execute resident web browser programs 112 and 114 to display web content through web pages. In one embodiment, the web browser program for each client computer is implemented using Microsoft® Internet Explorer™ browser software, but other similar web browsers may also be used. Thus, as shown, network 110 couples the client computers 102 and 104 to game server computer 127, which can execute a web server process locally or through a separate web server 125 that serves web content in the form of web pages to the client computers.

The game programs are executed on the game server computer 127 and each player accesses the game program through interface modules executed on their respective client computers 102 and 104. Depending upon the implementation of the game playing software, portions of the game programs may also be provided in client side software routines that are executed directly on the client computers.

In the disclosed online, multiplayer game system, players register to participate in tournament rounds or single games of games such as poker, other card games, or similar casino games that involve both skill and chance. In one embodiment, customers register with the game administrator by providing user identification information and paying a registration or subscription fee to access the game site maintained by the game server. This will enable them to participate in both regular tournaments that occur during their registration period as well as in regular "ring" games that may be held throughout the period. Tournament winners will be determined through an elimination process based on their play. Tournament winners and runner-ups will receive rewards, such as cash prizes based on their performance. In one embodiment of the present invention, non-subscribing or non-registered members will have the ability to participate in tournaments or ring games by utilizing an alternative method of entry (AMOE). This alternative method of entry may require the submission of identifying information, but will require no consideration, such as the payment of a registration fee or game entry fee to participate.

Figure 2:
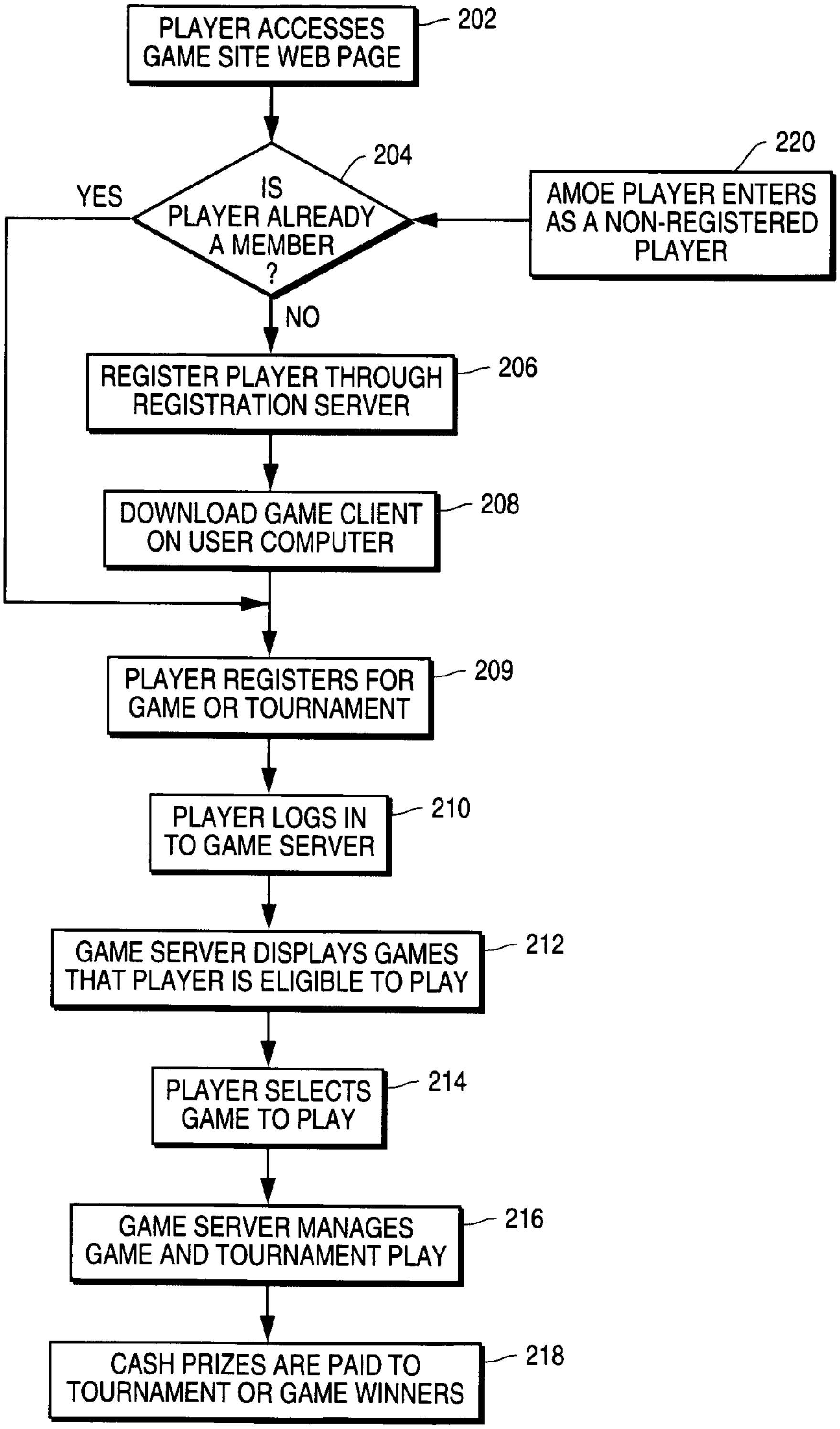
FIG. 2 is a flowchart that illustrates the general steps of administering an online game system, according to one embodiment of the present invention.

FIG. 2 is a flowchart that illustrates the steps of implementing an on-line game site, according to one embodiment of the present invention. The process illustrated in FIG. 2 represents an embodiment in which the user client computers access the registration and game server computers over the Internet through a web-based interface. In step 202, the player accesses the website hosted by the game server. In general, only registered players are allowed to participate in tournament or game play, thus in step 204 it is determined whether the player is registered with the game site. In the event that the player is not already a member player, he or she will need to go through a registration process executed on the registration server, step 206. The registration process generally includes obtaining all relevant personal information from the user (name, address, etc.) as well as credit card information, age verification, postal address verification, e-mail address verification, and screen name information (for further use of the site). This registration step 206 also generally requires the payment of a subscription fee.

In general, a player who has paid the registration or subscription fee is referred to as a "subscription player." A player who has registered with the game site without paying, such as through an AMOE, step 220, is generally referred to as a "non-subscription" player. Both subscription and non-subscription players are required to provide personal or identifying information with the game server and may then be considered "member" players.

After a user registers by subscribing with the game server, the new user will need to download the game client portion of the software in order to be able to play on the game site, step 208. The client side version of the game software may consist of actual programming code that is designed to work with the server side modules executed on the game server, or it may consist simply of validation or access modules that allow the client computer to access the game server. The client side software is made available for download to each client computer from the game server. The download page served by the game server includes instructions on how to download and install the software on the client computer.

Once a player has registered or subscribed with the game server, he or she is eligible to participate in any of the ring games or tournaments that are held during the valid registration period. Each player must then register for the individual games or tournaments that he or she wishes to participate in, step 209. Once a player registers for a game or tournament, the player logs in to the game server to play that game, step 210. If, in step 204 it is determined that the player is already a subscribed member, the player skips the game server registration page and proceeds to the game/tournament registration step 209 and logs in through the login page to gain access to the game server, step 210. If the player is a new player who has just registered, he or she will also need to log in to the system in order to access the game software.

In step 212, the game server determines the games that the user is eligible to play and displays the selection to the user. A wide variety of different online games can be made available. The games can be strict games of chance (e.g., as lottery games), games of skill (e.g., chess), or games that mix elements of skill and chance, such as poker. The eligibility of each individual user to play a game can depend on a number of different factors, such as user preferences, game playing history, and so on. The user selects a game from the displayed menu, step 214, and the game server manages the game and/or tournament play for the user, step 216. This typically involves causing the display of a virtual game room on each participating client computer, and automatically applying the rules of the game for the participating players. After a game or tournament is concluded, the appropriate prizes are distributed to the qualifying winners, step 218. In one embodiment, the prizes are distributed in the form of immediately negotiable or redeemable instruments, such as cash or cash-equivalent notes, or prizes that have immediate value.

In general, players participating in games or tournaments hosted by the game server will pay a registration fee to have access to the game server website. In one embodiment, the registration fee is a periodic fee that is paid on a recurring basis and establishes a registration period. In another embodiment, the fee is a fee that is paid on a per game or per tournament basis. The registration process enables a player to participate in both regular game tournaments that occur during the registration period, as well as in regular "ring" games held throughout the period.

In a typical implementation, registered players or "subscribers" will pay a fee per period, such as $19.95 per month, which will give them unlimited ability to play in daily, weekly, and monthly online game tournaments (as well as ongoing "ring" play) that are hosted by the system. Registration terms can be flexible and provide incentives for commitment to longer periods. For example, discounted pricing can be offered to subscribers who are willing to commit to a fixed term contract. Various different pricing packages can be offered, such as a per month payment (e.g., $19.95) with no monthly commitment, or a lower monthly payment for a longer commitment (e.g., $15.95 per month for a 6 month commitment or $12.95 per month for a 12 month commitment).

In one embodiment, subscribers register with the game site through the website maintained by the game administrator. Payment options can include credit cards, checks, electronic funds transfer or debit cards, or other valid methods of payment. Subscribers will be required to provide information for age verification (only players who are 18 years and over will be permitted to play), a valid e-mail address, a valid mailing address, and an agreement to abide by the stated terms and conditions of the game administrator and/or website administrator(s).

As illustrated in FIG. 2, the principal model for player participation in the games hosted by the game site is through the registration process in which each player establishes an account and typically pays a registration fee to maintain this account. The system also allows non-registered users to participate in a game or tournament through an alternative method of entry, step 220. The AMOE player enters the system as a non-registered player by providing suitable identifying information and complying with certain restrictions regarding their participation, and then logs in and downloads the game software in the same manner as a registered player. The system initially checks to see whether the AMOE player is already a member in step 204, and then the process proceeds through the game registration and game hosting steps 206–218, as shown.

In one embodiment, AMOE customers will be required to download an AMOE form from the game administrator website, which they must fill in and mail to the company in an appropriate envelope. The AMOE form will require the customer to provide their name, a valid mailing address, a valid e-mail address, a valid credit card (for age verification) and a listing of the games or tournament they wish to participate in, as well as any other required information. Each tournament or individual ring game entry will require a separate entry form for each AMOE customer to be submitted, and only one AMOE entry is allowed per person per game or tournament. Certain restrictions, such as that forms must be received a certain number of business days prior to the start of a tournament to be valid, and that AMOE customers must register (without payment) to confirm their attendance at a tournament within a set number of hours before the start of the tournament, may also be imposed. During the game or tournament, AMOE customers are treated with equal dignity in that they are given an equal chance to win a particular game or tournament and are treated the same as registered players during each game.

The game server 127 hosts a number of different on-line games during the registration periods for subscribing and AMOE players. These games can include a wide variety of card games, such as poker, as well as on-line versions of non-card games that involve both skill and chance, such as backgammon, mahjong, and so on. In general, the games hosted by the server are games that require active player participation and decision making processes during the course of game play. This excludes games or betting systems in which play and game outcome are automatically determined through the computer software, or through predetermined playing commands or rules.

In a preferred embodiment, the game server will host a number of different on-line poker games, such as Texas Hold'em, 7-card stud, and Omaha. Many other popular types of poker games, non-poker card games (such as 21, baccarat, or hearts), and even non-card games can also be hosted. It should be noted that certain jurisdictions in the United States consider poker a game of skill, while others consider it a game of chance. For purposes of this disclosure, poker is assumed encompass a class of card games that combine elements of skill and chance.

In general, two types of play will be provided, i.e., "ring" game play, and tournament play. Ring games are ongoing games that participants can join at any time, similar to those offered in an actual casino. In the online embodiment, players can enter a website that displays a virtual lobby, they then "sit" down at the table of their choice and play against other networked players for play chips. Each day, participants can register for a set number (e.g., 1000) of play chips to be used in ring games. At the end of a set period, such as every week, cash prizes will be awarded to the ring game players with the most play chips. Prize pools are established for ring game winners. For example, an initial weekly prize pool for ring games can be set at a certain amount (e.g., $4500) which will be shared equally among a set number (e.g., 300) of winning players. Winners will have the option of receiving a cash prize (paid as a check or account payment, such as Paypal® or bank transfer) or applying their winnings to future months subscription fees. Other prizes, such as objects that have immediate value, can also be awarded to the winners.

Tournament play entails a fixed number of players competing for prizes in a fixed period of time. Tournaments can be held on a daily, weekly and monthly basis with various different initial prize pools based on the tournament duration. For example, prize pools can be for daily, weekly, and monthly tournaments, and can be set at $750, $5000, and $25,000 respectively.

For tournament play comprising a series of games, certain restrictions may be imposed to facilitate game administration. For example, participants may be required to register for tournaments by filling out an online form within a preset time frame (e.g., two to five days) before the start of the tournament. Tournaments can also be capped in terms of a maximum number of participants based on a "first come first served" basis.

In general, tournament winners will be determined through an elimination process based on their play. The criteria for winning generally depend on the rules and mechanics of the game being played. Entry to each game, game round, or tournament is provided in the form of game tokens or chips, similar to that of a real casino game. In one embodiment of the present invention, each tournament participant will receive the same number of starting chips or tokens at the beginning of each tournament, and players will play until one player has accumulated all of the chips. Tournament duration will be controlled through a combination of continually increasing minimum ante amounts as well as time-based elimination and cuts. Players will be eliminated when they have lost all of their chips. Players may also be eliminated as part of a time-based "cut." This mechanism functions like a golf tournament, in which the bottom performing players are eliminated part-way through the tournament based on their score.

Upon registration for a game or tournament in step 209, a participating player in either a ring game or tournament will be "given" a number of tokens (or chips). These chips allow the player to participate in the game and use the chips as betting tokens for the jackpot established for each game or hand. The chips are not related to the subscription fee or AMOE mechanism, and each player receives the same number of chips per game. The number of chips assigned to each player, or currently owned by each player during play of the game is displayed along with the player icon in the virtual game room. The number of chips owned by a player at any time is stored in the database 131 and may be accessed through a user profile page served by the game server. Certain games hosted by the game server may not require the use of chips or tokens as the means of establishing a pot. Such games may use a point system (e.g., hearts) to establish a winner. For these games, each participating player is assigned an initial number of points. During game play, points are accumulated or deducted from each players total until a winner is determined.

In one embodiment of the present invention, tournament winners and runner-ups will receive prizes based on their performance. The prizes will comprise cash, cash-equivalent payments, or prizes that have immediate intrinsic value. Each participant in a tournament will have a ranking based on past performance in tournaments. Various different ranking schemes can be used. For example, a common ranking scheme will assign three ranks—gold, silver, and bronze (this nomenclature is for illustrative purposes only). In the first tournament for a player, he or she will be given a bronze ranking by default. As the player progresses through series of tournaments, his or her ranking will improve depending upon results, until the player reaches gold, which is the highest ranking.

Various different prize pools can be established and distributed. The prize pools can vary depending upon the type of game, length of tournament, number of players, size of the pot, and so on. FIG. 3 is a table that lists an illustrative prize pool for a hypothetical monthly tournament. Table 300 lists the various categories of winners, the number of winners per category, the prizes per winning category and the total cost of the prize distributions. Daily and weekly tournaments can follow similar distributions, with overall top players as well as top players within a ranking category winning prizes. The prize distribution scheme shown in FIG. 3 is intended to serve only as an example. Many different type of prize pools can be established depending upon the organization of the game system. The prize pools can be funded through a variety of different funding sources. For example, the registration fees paid by the member players can go toward funding the prizes, as can advertising revenue from advertisers who sponsor the game site or display ad messages on the web pages hosted by the game server.

The use of a prize pool provides a mechanism that prevents participating players from wagering their own money in the game. Risk for each player is eliminated, as a player can enter none or many games during their membership period, or through an AMOE for each game. Payment of the registration fee or entry through the AMOE route provides the player with the ability to register for a certain number of "chips" or tokens that the player uses to wager in the games. These chips to do not represent a player's own cash, and it is generally not possible for a player to amass more chips for a tournament by paying more registration fees for the period. Each player in a tournament receives the same number of starting chips.

In one embodiment of the present invention, as illustrated in FIG. 1, the interface between the game server computer and the user client computers is implemented through web-based Internet connections. The game server 127 hosts a game site through one or more web pages accessible through a web server 125. Client side portions of the game software are downloaded and executed on the client computers 102 and 104, and the users access the game site web pages through local web browser programs 112 and 114.

Figure 4:
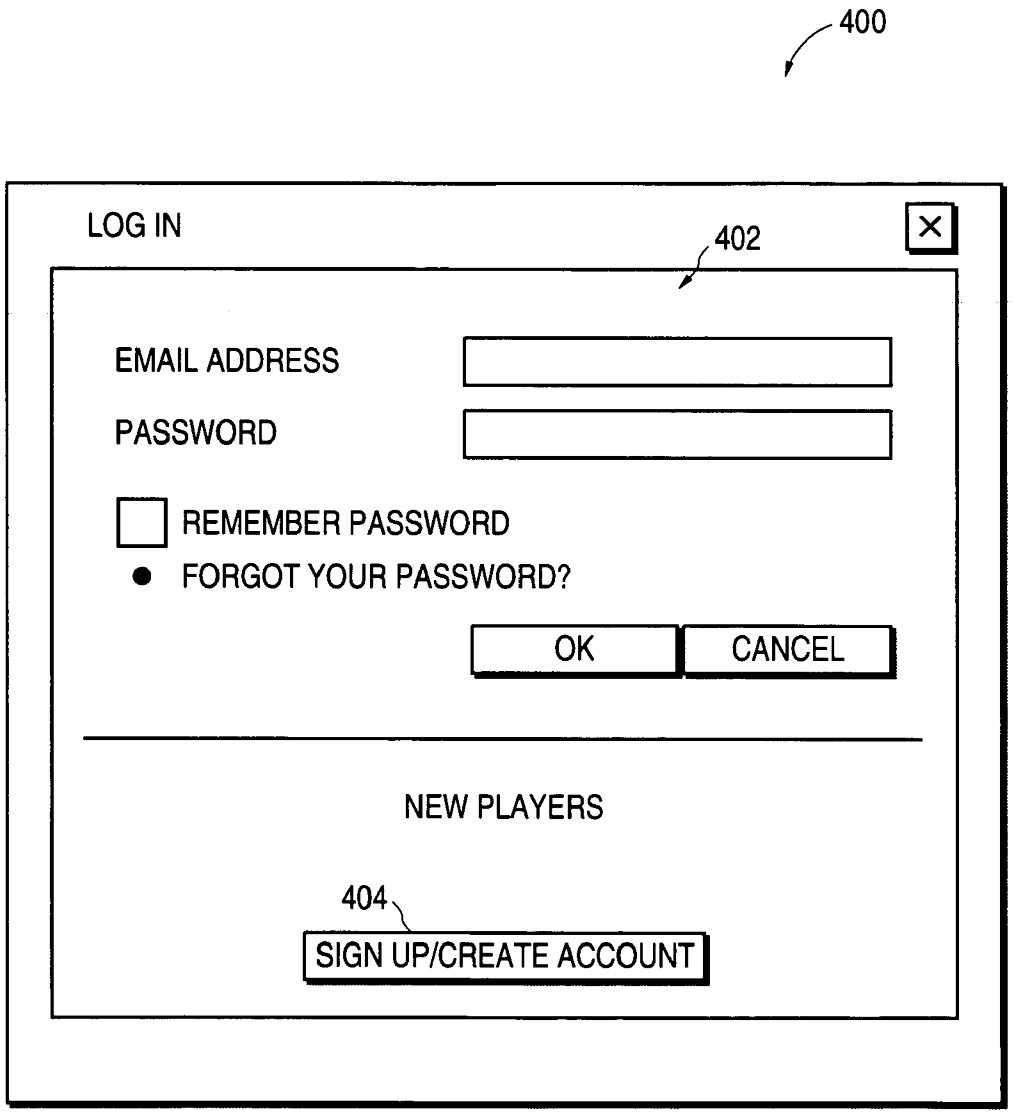
FIG. 4 illustrates a screen display for a login page of a registration server computer, according to one embodiment of the present invention.

As illustrated in the flowchart of FIG. 2, players log into the game server prior to entering a game or tournament. FIG. 4 illustrates a screen display for a login page, according to one embodiment of the present invention. The login page 400 includes user input fields 402 that allow a user to enter his or her identifier (e.g., e-mail address) and password. New players can register and create their user account by using command 404.

Figure 5:
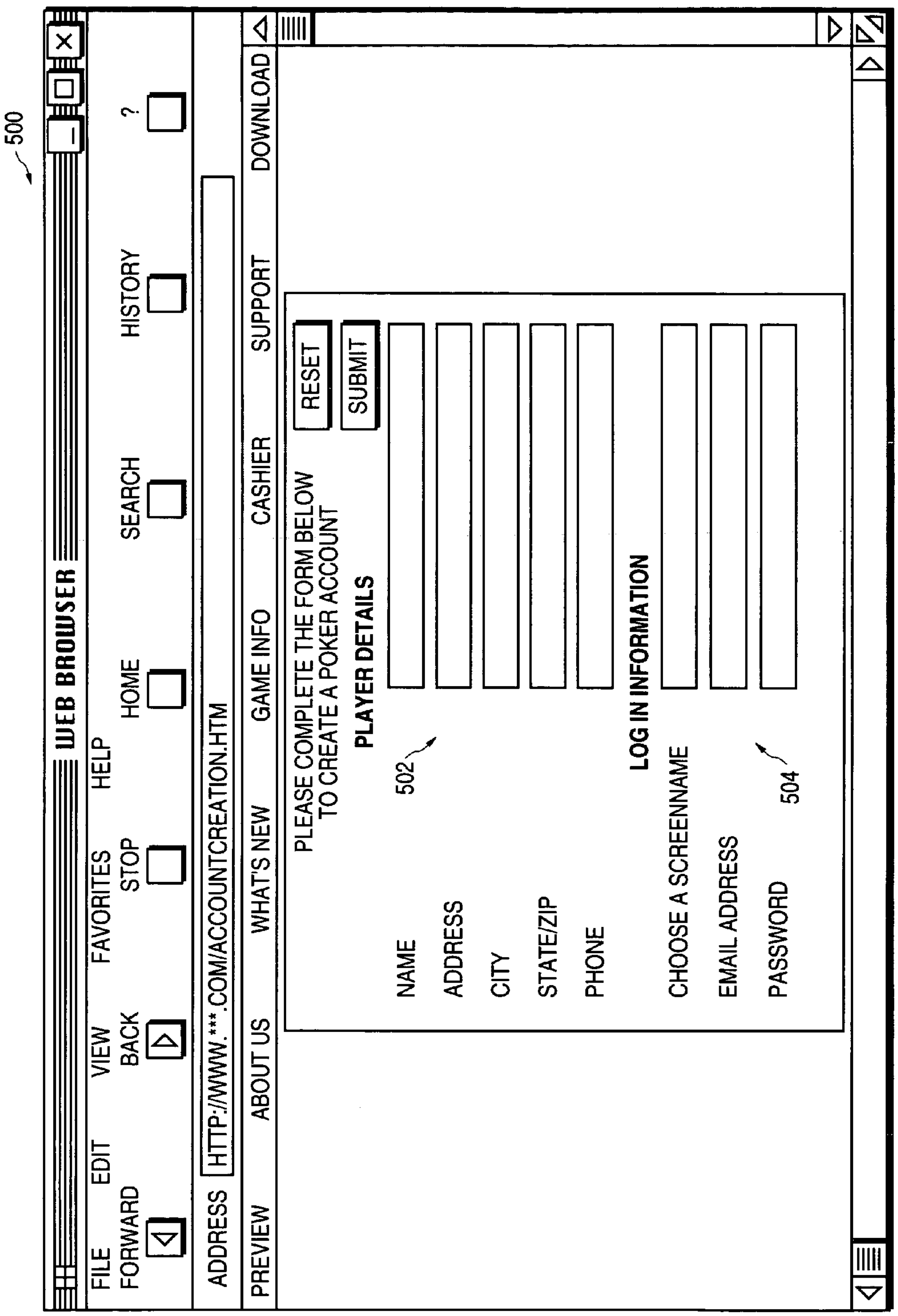
FIG. 5 illustrates a screen display for a player registration and account creation screen, according to one embodiment of the present invention.

If a player is a first time user who needs to register with the registration server, as shown in step 206 of FIG. 2, the player selects command 404 in the login screen 400. This causes the display of an account creation screen, such as that illustrated in FIG. 5. The account creation screen contains several user input fields for the entry of user information. The user enters his or her identifying information in the "Player Details" area 502. This information includes specific information relating to the user, such as name, address, phone, and other similar items of information. The user also enters information relating to the created account in the "Login Information" section 504. This information identifies the user within the registration server 130.

Users who have subscribed or entered a valid AMOE entry form can also access the website of the game server. For games or tournaments in which players are given a number of chips or tokens to bet, the non-paying AMOE members are given at least the same number of chips as registered paying members. In general, the AMOE members are given the same number of starting chips as registered players, but in some instances an AMOE member may be given one or more chips greater than the registered players. In either case, each AMOE member is only allowed one AMOE entry per tournament.

Figure 6:
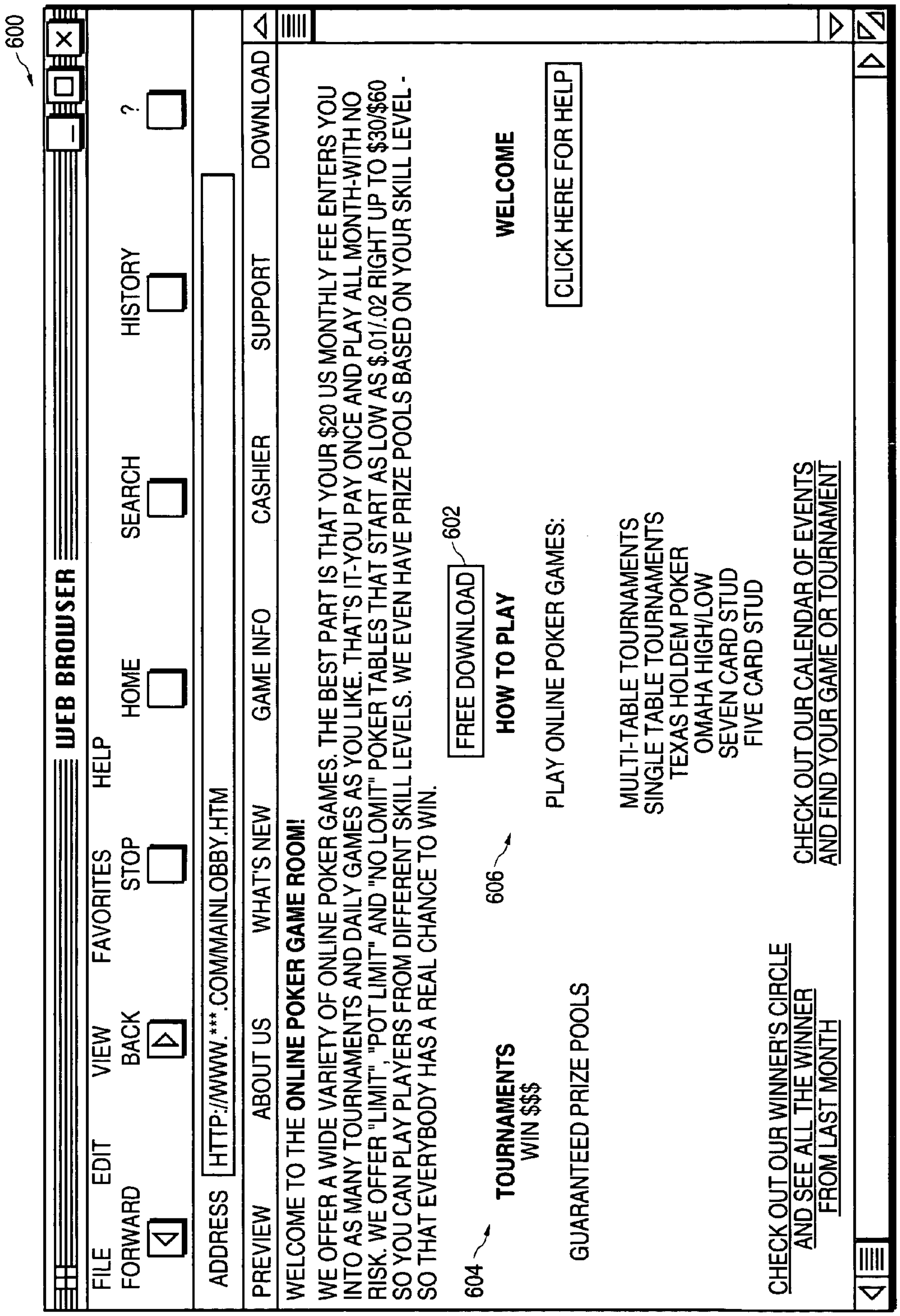
FIG. 6 is an illustration of a main web page of a game server web site, according to one embodiment of the present invention.

FIG. 6 is an illustration of an exemplary main page, referred to as the "main lobby" of the game server web site. Web page 600 is the page that everyone will reach if they access the website of the game server. This page contains a description of the game site and links to further description of various aspects of the game system and individual games in much greater detail for new users. For returning users, the main lobby web page contains features such as personal tournament history, daily game ranking, lists of winners, lists of future tournaments available, tournaments already registered for, and so on. For the exemplary main lobby web page illustrated in FIG. 6, web page 600 includes a download command button 602 that allows the user to download the client side programs for the game software, a tournament section 604 that allows access to pages describing or providing access to current tournaments, and an online game section 606 that provides access to individual games or ring games, as well as a description and list of rules for each of the possible games that are supported on the game site.

Figure 7:
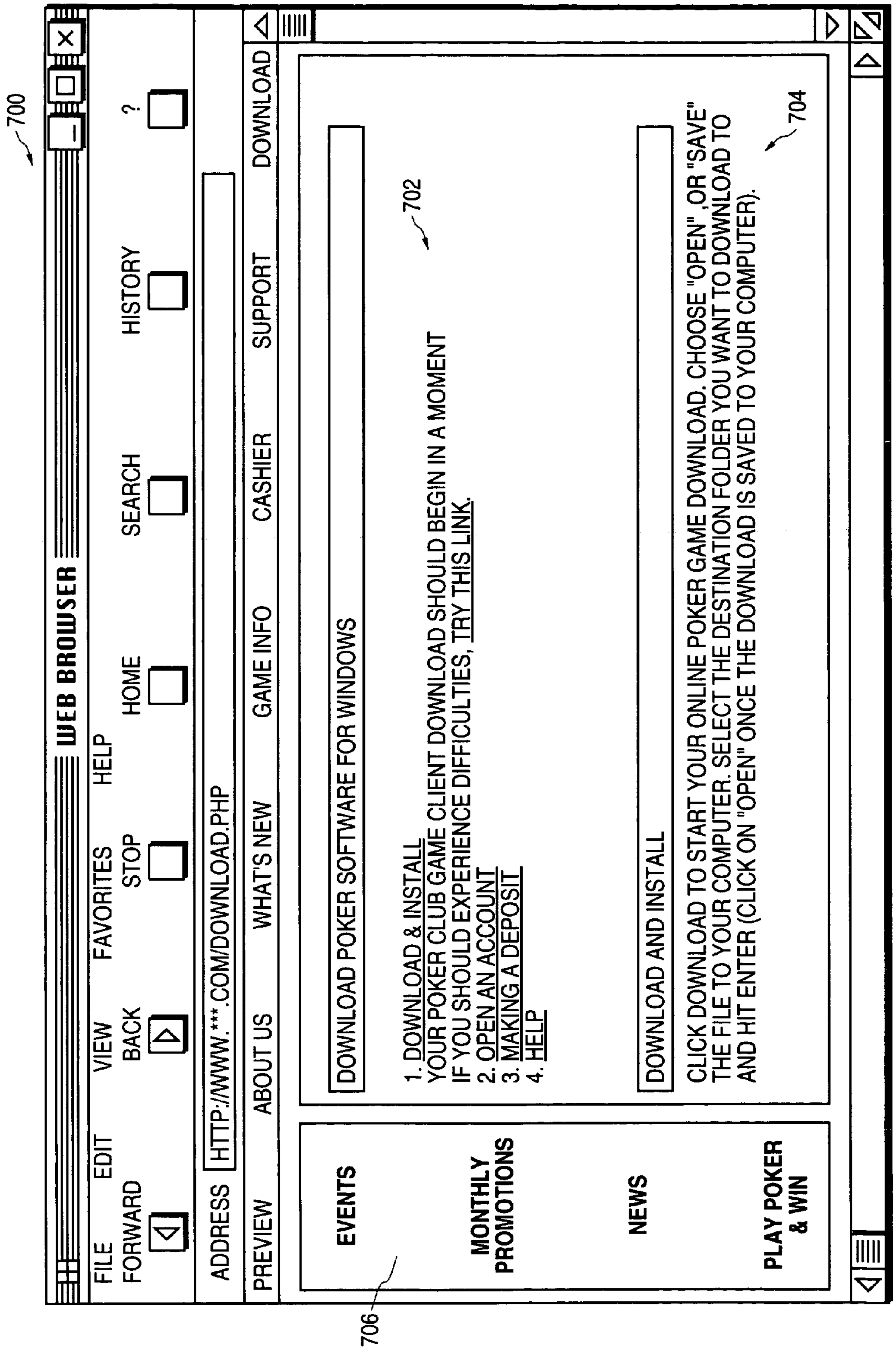
FIG. 7 illustrates a download software web page, according to one embodiment of the present invention.

If the player selects the download game option, a download software web page, such as that illustrated in FIG. 7 is displayed. The download page 700 has a display area 702 that allows a user to download the software, and conduct other registration business, such as open an account or make a payment. The download and install section 704 provides instructions and commands to actually download and install the client side programs on the user's client computer. A link section 706 provides access to other areas of the game site, such as an events listing, monthly promotions, news, and so on.

The main lobby screen of FIG. 6 displays or provides links to a display area that shows a listing of all the games currently running. Each player, once logged in, will be able to choose from all games they are eligible to play. Once a player selects a game to be played, he or she enters a virtual game room (assuming there are still seats available) and is able to "sit" at a table and play the selected game.

Figure 8:
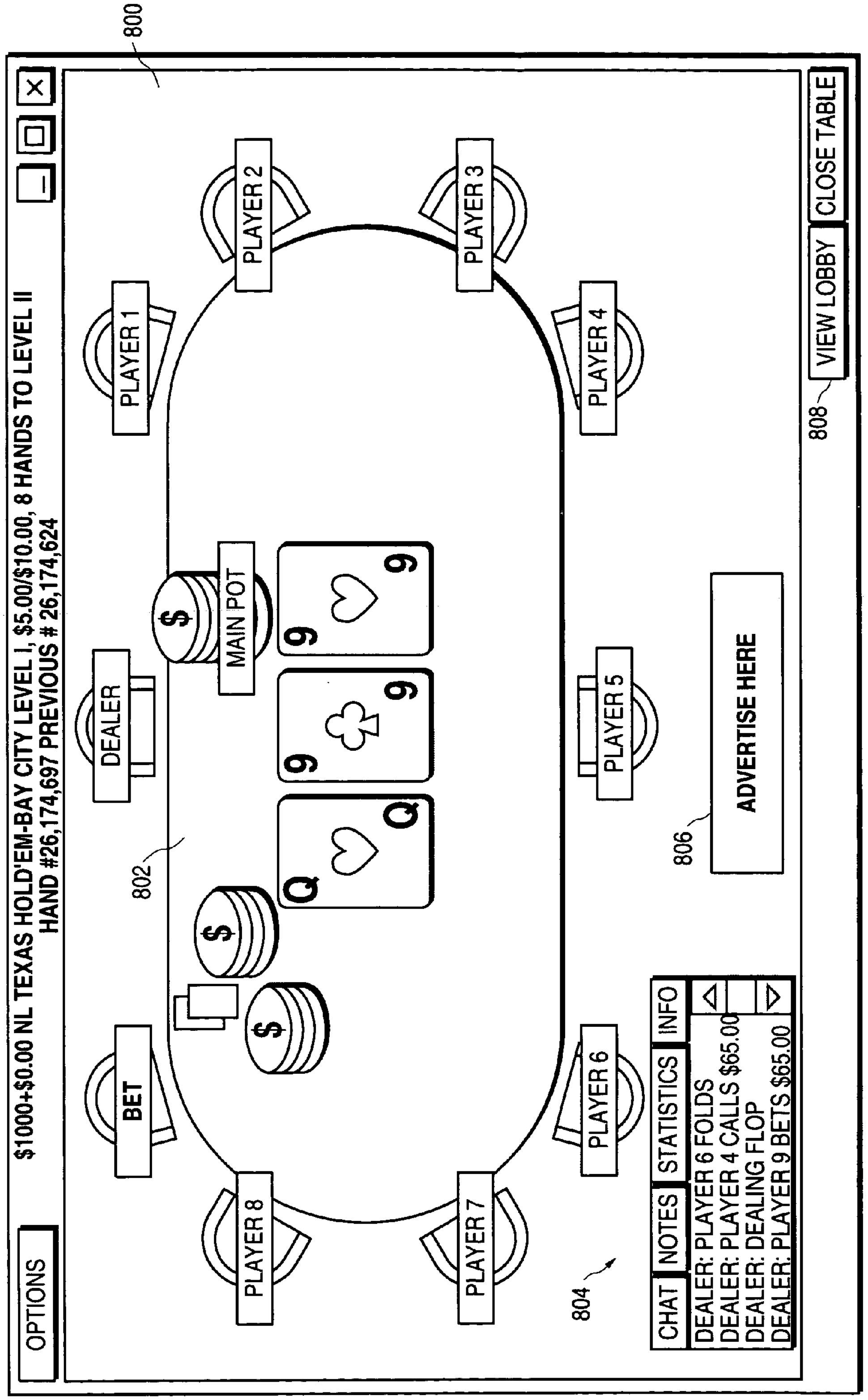
FIG. 8 illustrates an exemplary game room hosted on a game server, according to one embodiment of the present invention.

FIG. 8 illustrates an exemplary game room hosted on the game server, according to one embodiment of the present invention. The game room illustrated in web page 800 shows a poker room where the actual games and tournaments are played for a particular game of poker. The main table 802 serves as the region around which the players and dealer are seated. Each participating player is represented as a labeled seat icon or other similar avatar. The cards will be dealt in the middle of the table and all bets will be calculated by the game software. Depending upon the game being played, various game mechanics are managed by the game software, such as the current size of the pot and bet status, as well as any necessary timers limiting the period of time allowed for each player to check, raise, call or fold on a hand. Particular events in a game are recorded and displayed in a display area 804. Other display areas, such as advertising displays 806 can also be provided. Option buttons, such as command button 808 provide navigation access to other pages within the game site.

The above-described system and method provides a platform for players to enter an online poker tournament or similar computerized game rounds and compete against one another to win actual cash or cash equivalent prizes. Players register with the game administrator and pay a periodic fee in exchange for free access to the games or tournaments that are hosted for the appropriate registration period. The provision for alternative methods of entry allows non-paying members access to the game.

Although specific programming languages and application programs have been cited for use in conjunction with embodiments of the present invention, it should be noted that variations known by those of ordinary skill in the art can be used instead of, or in combination with the specifically cited structures and methods.

In the foregoing, a system has been described for an online, multi-user game system utilizing subscription based membership and alternative methods of access. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer-implemented method of allowing a plurality of players to play a game over a computer network, the method comprising the steps of:

establishing a subscription-based membership for each player of the plurality of players by charging each player a fee for a pre-determined membership time period;

hosting at least one game tournament for subscription-based players for a game that has elements of both chance and skill during the membership time period, the tournament consisting of at least one game round, each game round potentially eliminating one or more participant players until a winning player and one or more runner-up players are determined, wherein each player is required to make playing choices throughout the game;

establishing a prize pool for the tournament;

providing a means for allowing a non-subscription player to participate in the tournament without payment of the fee by submitting information relating to the non-subscription player prior to the hosting of the tournament, wherein the non-subscription player is limited to one entry per tournament; and disbursing the prize pool to the winning player and any eligible runner-up players in the form of prizes that have immediate value, subsequent to completion of the tournament.

2. The method of claim 1 wherein the game tournament is managed by a game administrator operating a game server computer coupled to one or more client computers operated by the participating players.

3. The method of claim 2 wherein the computer network comprises the Internet.

4. The method of claim 1 wherein the game comprises a card game.

5. A computer-implemented method of allowing a plurality of players to play a game over a computer network, the method comprising the steps of:

establishing a subscription-based membership for each player of the plurality of players by charging each player a fee for a pre-determined membership time period;

hosting at least one game tournament for subscription-based players for a game that has elements of both chance and skill during the membership time period, the tournament consisting of at least one game round, each game round potentially eliminating one or more participant players until a winning player and one or more runner-up players are determined, wherein each player is required to make playing choices throughout the game;

establishing a prize pool for the tournament;

distributing a fixed number of tokens to each player participating in the tournament for betting in the tournament, the fixed number not dependent upon any consideration provided by the player;

providing a means for allowing a non-subscription player to participate in the tournament without payment of the fee by submitting information relating to the non-subscription player prior to the hosting of the tournament, wherein the non-subscription player is limited to one entry per tournament;

distributing at least the same number of tokens to each non-subscription player participating in the tournament as each subscription player participating in the tournament, for betting in the tournament; and disbursing the prize pool to the winning player and any eligible runner-up players in the form of prizes that have immediate value, subsequent to completion of the tournament.

6. The method of claim 5 wherein the game tournament is managed by a game administrator operating a game server computer coupled to one or more client computers operated by the participating players.

7. The method of claim 6 wherein the computer network comprises the Internet.

8. The method of claim 5 wherein the game is a card game.

9. The method of claim 8 wherein the card game comprises poker.

* * * * *